United States Patent
Kenin

(10) Patent No.: US 12,307,910 B2
(45) Date of Patent: May 20, 2025

(54) NAVIGATION SYSTEMS AND METHODS FOR OPERATION

(71) Applicant: Aurora Flight Sciences Corporation, a subsidiary of The Boeing Company, Manassas, VA (US)

(72) Inventor: Jacob Kenin, Acton, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 469 days.

(21) Appl. No.: 17/360,828

(22) Filed: Jun. 28, 2021

(65) Prior Publication Data

US 2022/0058962 A1 Feb. 24, 2022

Related U.S. Application Data

(60) Provisional application No. 63/068,132, filed on Aug. 20, 2020.

(51) Int. Cl.
*G08G 5/00* (2006.01)
*B64D 47/02* (2006.01)
(Continued)

(52) U.S. Cl.
CPC .......... *G08G 5/0047* (2013.01); *B64D 47/02* (2013.01); *G05D 1/106* (2019.05); *G05D 1/437* (2024.01);
(Continued)

(58) Field of Classification Search
CPC ........ B64D 45/04; B64D 45/08; B64D 47/02; G05D 1/0653; G05D 1/0676; G05D 1/106;
(Continued)

(56) References Cited

U.S. PATENT DOCUMENTS 10,029,804 B1 * 7/2018 Chamberlain ..... G01C 21/1656
2003/0225487 A1 * 12/2003 Robert ................ G05D 1/0676
701/16

(Continued)

FOREIGN PATENT DOCUMENTS

CN 102682292 A 9/2012
CN 106225723 A 12/2016
(Continued)

OTHER PUBLICATIONS

Extended European Search Report prepared by the European Patent Office in application No. EP 21 19 1779.4 dated Jan. 18, 2022.
(Continued)

*Primary Examiner* — Angela Y Ortiz
*Assistant Examiner* — Aaron K McCullers
(74) *Attorney, Agent, or Firm* — Harrity & Harrity, LLP

(57) ABSTRACT

A navigation system for an aircraft includes a light source, a light sensor, one or more processors, and a computer readable medium storing instructions that, when executed by the one or more processors, cause the navigation system to perform functions. The functions include illuminating a surface using the light source to cause light to be reflected from the surface and detecting the light and generating data representing the light using the light sensor. The data maps intensities of the light to respective positions on the surface. The functions further include identifying within the data a subset of the data that corresponds to a border and causing navigation of the aircraft based on a position of the border indicated by the subset of the data.

20 Claims, 12 Drawing Sheets

(51) Int. Cl.
    *G01S 17/88*     (2006.01)
    *G01S 17/89*     (2020.01)
    *G05D 1/00*     (2024.01)
    *G05D 1/437*     (2024.01)
    *G08G 5/02*     (2006.01)

(52) U.S. Cl.
    CPC ............... *G05D 1/439* (2024.01); *G08G 5/02* (2013.01); *G08G 5/025* (2013.01); *G01S 17/88* (2013.01); *G01S 17/89* (2013.01)

(58) Field of Classification Search
    CPC ..... G01S 13/913; G01S 17/88; G08G 5/0021; G08G 5/02; G08G 5/025; G08G 5/0047; G08G 5/0086
    USPC ........... 73/178; 340/951, 972; 382/153, 154, 382/181; 701/3, 16, 17, 18, 28
    See application file for complete search history.

(56) References Cited

U.S. PATENT DOCUMENTS

| | | | | |
|---|---|---|---|---|
| 2010/0039294 | A1* | 2/2010 | Feyereisen | G06V 10/751 340/972 |
| 2013/0006533 | A1* | 1/2013 | Lax | G01W 1/00 702/3 |
| 2015/0170526 | A1 | 6/2015 | Wang et al. | |
| 2017/0283087 | A1* | 10/2017 | McNeill | G06F 16/252 |
| 2019/0353767 | A1* | 11/2019 | Eberspach | G01S 7/493 |
| 2020/0027362 | A1* | 1/2020 | Dame | G05D 1/0202 |

FOREIGN PATENT DOCUMENTS

| | | |
|---|---|---|
| CN | 110142805 A | 8/2019 |
| EP | 3 483 629 A1 | 5/2019 |
| KR | 100 985 195 B1 | 10/2010 |

OTHER PUBLICATIONS

European Official Communication issued by the European Patent Office in application No. EP 21 191 779.4 dated Jun. 12, 2024, 7 pages.

Boutteau, R. et al., "Road-line detection and 3D reconstruction using fisheye cameras", Proceedings of the 16th International IEEE Annual Conference on Intelligent Transportation Systems (ITSC), IEEE, 2013, 1083-1088.

Wang, X. et al., "Road Edge Detection Based on Improved RANSAC and 2D LIDAR Data", International Conference on Control, Automation and Information Sciences (ICCAIS), IEEE, 2015, 191-196.

* cited by examiner

```
┌─────────────────────────────────────────────────────┐
│  IDENTIFYING A SECOND SUBSET OF THE DATA THAT       │
│  CORRESPONDS TO A SECOND RUNWAY BORDER              │
└─────────────────────────────────────────────────────┘
 312⌐

┌─────────────────────────────────────────────────────┐
│ IDENTIFYING A THIRD SUBSET OF THE DATA THAT CORRESPONDS │
│ TO A THIRD RUNWAY BORDER THAT INTERSECTS THE FIRST  │
│ RUNWAY BORDER AND THE SECOND RUNWAY BORDER          │
└─────────────────────────────────────────────────────┘
 316⌐

┌─────────────────────────────────────────────────────┐
│ DETERMINING AN ANGLE AT WHICH THE FIRST RUNWAY BORDER│
│ INTERSECTS THE SECOND RUNWAY BORDER AND A POSITION OF│
│ THE ANGLE                                           │
└─────────────────────────────────────────────────────┘
 320⌐

```
┌─────────────────────────────────────────────────────────────┐
│  DETERMINING THAT THE FIRST RUNWAY BORDER FORMS A          │
│  PARTICULAR SHAPE WITH THE SECOND RUNWAY BORDER            │
└─────────────────────────────────────────────────────────────┘
   324                                              ↖ 322
```

FIG. 12

```
┌─────────────────────────────────────────────────────────────┐
│  IDENTIFYING A SECOND SUBSET OF THE DATA THAT DOES NOT     │
│           CORRESPOND TO A RUNWAY BORDER                     │
└─────────────────────────────────────────────────────────────┘
   328                         │
                               ▼
┌─────────────────────────────────────────────────────────────┐
│              DELETING THE SECOND SUBSET OF THE DATA         │
└─────────────────────────────────────────────────────────────┘
   330                                              ↖ 326
```

FIG. 13

NAVIGATION SYSTEMS AND METHODS FOR OPERATION

CROSS REFERENCE TO RELATED APPLICATION

The present application is a non-provisional patent application claiming priority to U.S. Provisional Application No. 63/068,132, filed on Aug. 20, 2020, the contents of which are hereby incorporated by reference.

FIELD

The present disclosure generally relates to navigation systems and methods for operating them, and more specifically to aircraft navigation systems and methods for operating them.

BACKGROUND

Autonomous aerial vehicles generally include some kind of autonomous navigation system to maneuver in the air or on the ground (e.g., during taxiing). Some conventional autonomous navigation techniques include using visible light cameras to capture successive images of a runway or another surface that the aircraft is taxiing on and analyzing each pixel of those images to identify runways or taxiways within those images. This can be very time intensive and computationally demanding. Additionally, such techniques can be less reliable in inclement weather such as rain or snow or in low light conditions. As such, a need exists for more efficient and environmentally resistant systems and methods for autonomous navigation of an aircraft on a ground surface.

SUMMARY

One aspect of the disclosure is a navigation system for an aircraft comprising: a light source; a light sensor; one or more processors; and a computer readable medium storing instructions that, when executed by the one or more processors, cause the navigation system to perform functions comprising: illuminating a surface using the light source to cause light to be reflected from the surface; detecting the light and generating data representing the light using the light sensor, wherein the data maps intensities of the light to respective positions on the surface; identifying within the data a subset of the data that corresponds to a border; and causing navigation of the aircraft based on a position of the border indicated by the subset of the data.

Another aspect of the disclosure is a non-transitory computer readable medium storing instructions that, when executed by a navigation system of an aircraft, cause the navigation system to perform functions comprising: illuminating a surface to cause light to be reflected from the surface; detecting the light and generating data representing the light, wherein the data maps intensities of the light to respective positions on the surface; identifying within the data a subset of the data that corresponds to a border; and causing navigation of the aircraft based on a position of the border indicated by the subset of the data.

Another aspect of the disclosure is a method of operating a navigation system of an aircraft, the method comprising: illuminating a surface to cause light to be reflected from the surface; detecting the light and generating data representing the light, wherein the data maps intensities of the light to respective positions on the surface; identifying within the data a subset of the data that corresponds to a border; and causing navigation of the aircraft based on a position of the border indicated by the subset of the data.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 9 is a block diagram of a method, according to an example.

FIG. 10 is a block diagram of a method, according to an example.

FIG. 11 is a block diagram of a method, according to an example.

FIG. 12 is a block diagram of a method, according to an example.

FIG. 13 is a block diagram of a method, according to an example.

DETAILED DESCRIPTION

As discussed above, a need exists for more efficient and environmentally resilient systems and methods for autonomous navigation of an aircraft on a surface (e.g., a ground surface). Within examples, a navigation system for an aircraft includes a light source, a light sensor, one or more processors, and a computer readable medium storing instructions that, when executed by the one or more processors, cause the navigation system to perform functions. The functions include illuminating a surface using the light source to cause light to be reflected from the surface and detecting the light and generating data representing the light using the light sensor. The data maps intensities of the light to respective positions on the surface. The functions further include identifying within the data a subset of the data that corresponds to a border between roadway and non-roadway, such as a runway border, and causing navigation of the aircraft based on a position of the border indicated by the subset of the data.

The functionality of the aforementioned navigation system can yield better response time and more efficient use of computational resources when compared to conventional navigation systems, as explained in more detail below. Additionally, the disclosed navigation system can help improve performance in low light conditions and in inclement weather.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-7B are schematic diagrams of a navigation system and related functionality.

Figure 1:
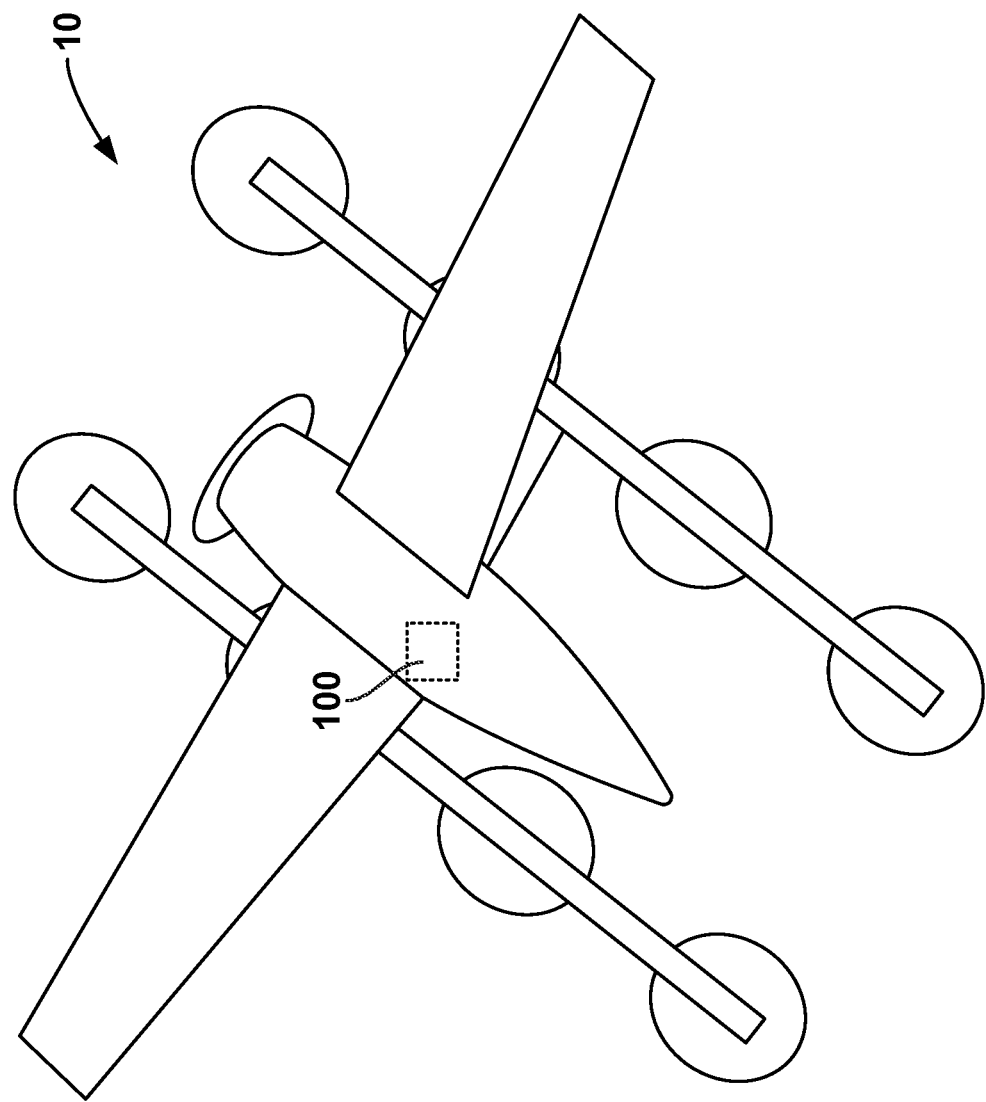
FIG. 1 is a schematic diagram of an aircraft, according to an example.

FIG. 1 is an example schematic view of an aircraft 10, according to an example. The aircraft 10 may be or include a fixed wing aircraft, a helicopter, a rotorcraft, an unmanned aerial vehicle (e.g., a drone or a satellite), a spacecraft, and the like. The aircraft 10 includes a navigation system 100, which further includes a computing system 150 that is described in more detail below.

Figure 2:
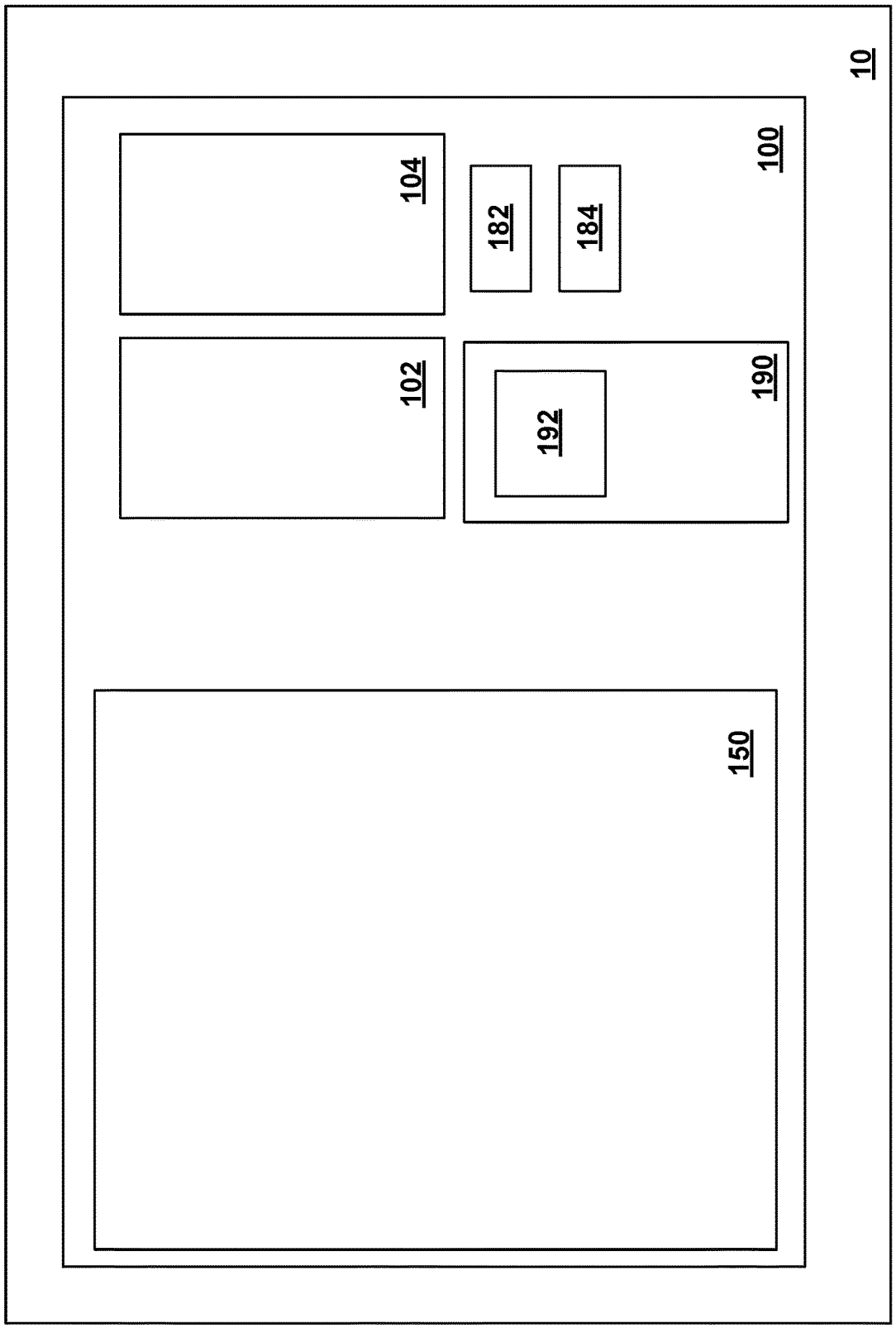
FIG. 2 is a schematic block diagram of an aircraft, according to an example.

FIG. 2 is a schematic block diagram of the aircraft 10. The navigation system 100 includes a light source 102 (e.g., one or more lasers) and a light sensor 104 (e.g., one or more photodetectors or photosensors). The light source 102 and the light sensor 104 are operationally in communication with other components of the navigation system 100 and are generally part of a light detection and ranging system (e.g., LIDAR). The light source 102 and/or the light sensor 104 can be forward facing or rearward facing with respect to the aircraft 10, but other examples are possible.

The navigation system 100 also includes control surfaces 182 and landing gear 184. The control surfaces 182 can include flaps, rudders, and ailerons, for example. The landing gear 184 includes one or more wheels that are motorized and can propel the aircraft 10 during ground travel, such as taxiing.

The navigation system 100 also includes an inertial navigation system 190 which can create data 192. The inertial navigation system 190 can include one or more accelerometers and/or gyroscopes.

Figure 3:
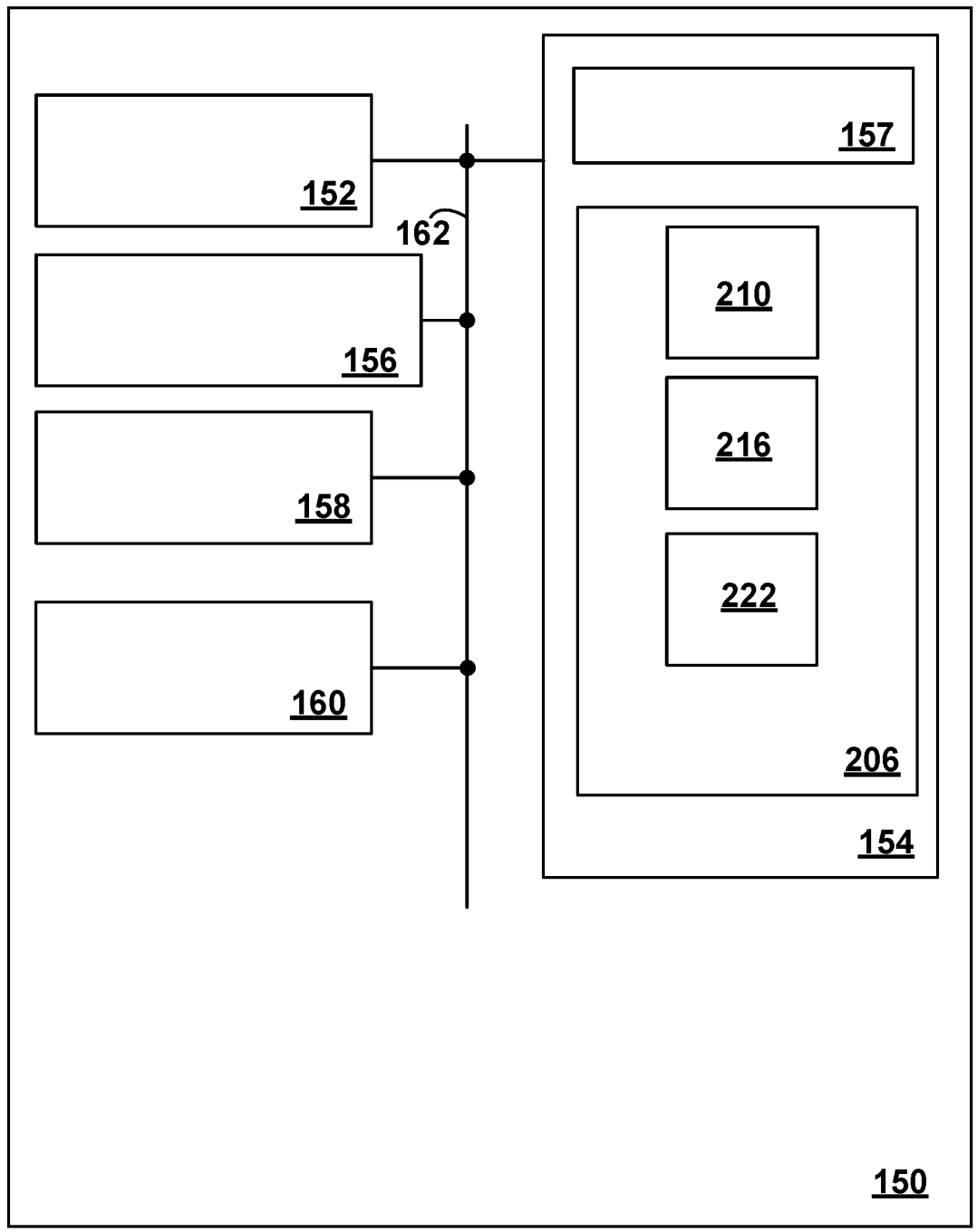
FIG. 3 is a schematic block diagram of a computing system, according to an example.

FIG. 3 is a schematic block diagram of the computing system 150.

The computing system 150 includes one or more processors 152, a non-transitory computer readable medium 154, a communication interface 156, a display 158, and a user interface 160. Components of the computing system 150 illustrated in FIG. 3 are linked together by a system bus, network, or other connection mechanism 162.

The one or more processors 152 can be any type of processor(s), such as a microprocessor, a digital signal processor, a multicore processor, etc., coupled to the non-transitory computer readable medium 154.

The non-transitory computer readable medium 154 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 154 can be configured to store instructions 157. The instructions 157 are executable by the one or more processors 152 to cause the computing system 150 to perform any of the functions or methods described herein.

The non-transitory computer readable medium 154 also stores data 206. The data 206 includes a subset 210, a subset 216, and a subset 222 of the data 206, as described in more detail below.

The communication interface 156 can include hardware to enable communication within the computing system 150 and/or between the computing system 150 and one or more other devices. The hardware can include transmitters, receivers, and antennas, for example. The communication interface 156 can be configured to facilitate communication with one or more other devices, in accordance with one or more wired or wireless communication protocols. For example, the communication interface 156 can be configured to facilitate wireless data communication for the computing system 150 according to one or more wireless communication standards, such as one or more Institute of Electrical and Electronics Engineers (IEEE) 801.11 standards, ZigBee standards, Bluetooth standards, etc. As another example, the communication interface 156 can be configured to facilitate wired data communication with one or more other devices.

The display 158 can be any type of display component configured to display data. As one example, the display 158 can include a touchscreen display. As another example, the display 158 can include a flat-panel display, such as a liquid-crystal display (LCD) or a light-emitting diode (LED) display.

The user interface 160 can include one or more pieces of hardware used to provide data and control signals to the computing system 150. For instance, the user interface 160 can include a mouse or a pointing device, a keyboard or a keypad, a microphone, a touchpad, or a touchscreen, among other possible types of user input devices. Generally, the user interface 160 can enable an operator to interact with a graphical user interface (GUI) provided by the computing system 150 (e.g., displayed by the display 158).

Figure 4:
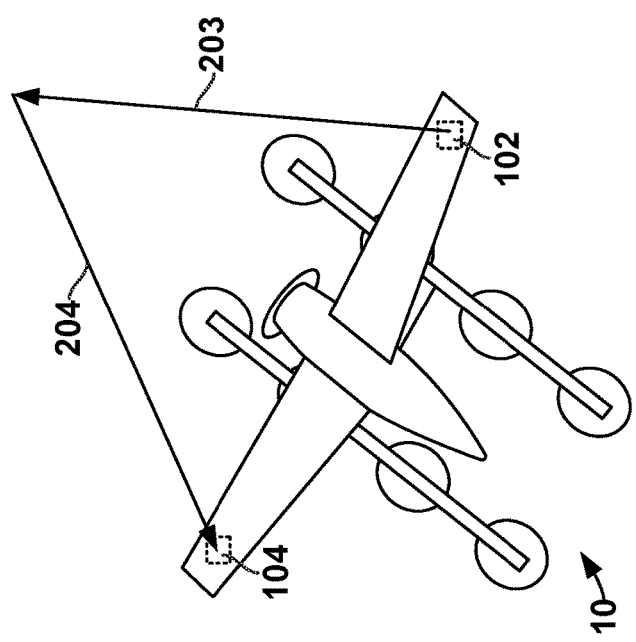
FIG. 4 is a schematic diagram of an aircraft positioned on a surface, according to an example.

FIG. 4 is a schematic diagram of the aircraft 10 positioned on a surface 202. A horizon 213 is pictured for clarity. The surface 202 can include combinations of many different types of surfaces such as runways, taxiways, or unpaved ground such as dirt or grass. The unpaved ground can help define borders of the runways or taxiways in that the unpaved ground is not considered part of the generally paved runways or taxiways.

The light source 102 of the aircraft 10 is used to illuminate the surface 202 with a light 203 (e.g., a laser light) to cause a light 204 to be reflected from the surface 202. The light sensor 104 detects the light 204 that reflects from the surface 202. Generally, paved surfaces such as runways or taxiways return the light 204 with greater intensity than unpaved surfaces such as grass or dirt. Additionally, paved surfaces such as runways or taxiways will generally have a distinctive three-dimensional shape when compared to other surfaces.

It should be noted that the terms runway and taxiway are used somewhat interchangeably herein. However, the term runway generally refers to a long and straight section of a (e.g., paved) surface that is used for takeoff and/or landing. The term taxiway generally refers to a paved surface used by a taxiing aircraft to get from a hangar to a runway and vice versa.

The light sensor 104 generates the data 206 representing the light 204. The data 206 maps intensities of the light 204 to respective positions on the surface 202. For example, the data 206 includes a table that maps intensity values of the light 204 to respective sets of three-dimensional Cartesian or spherical coordinates.

Figure 5A:
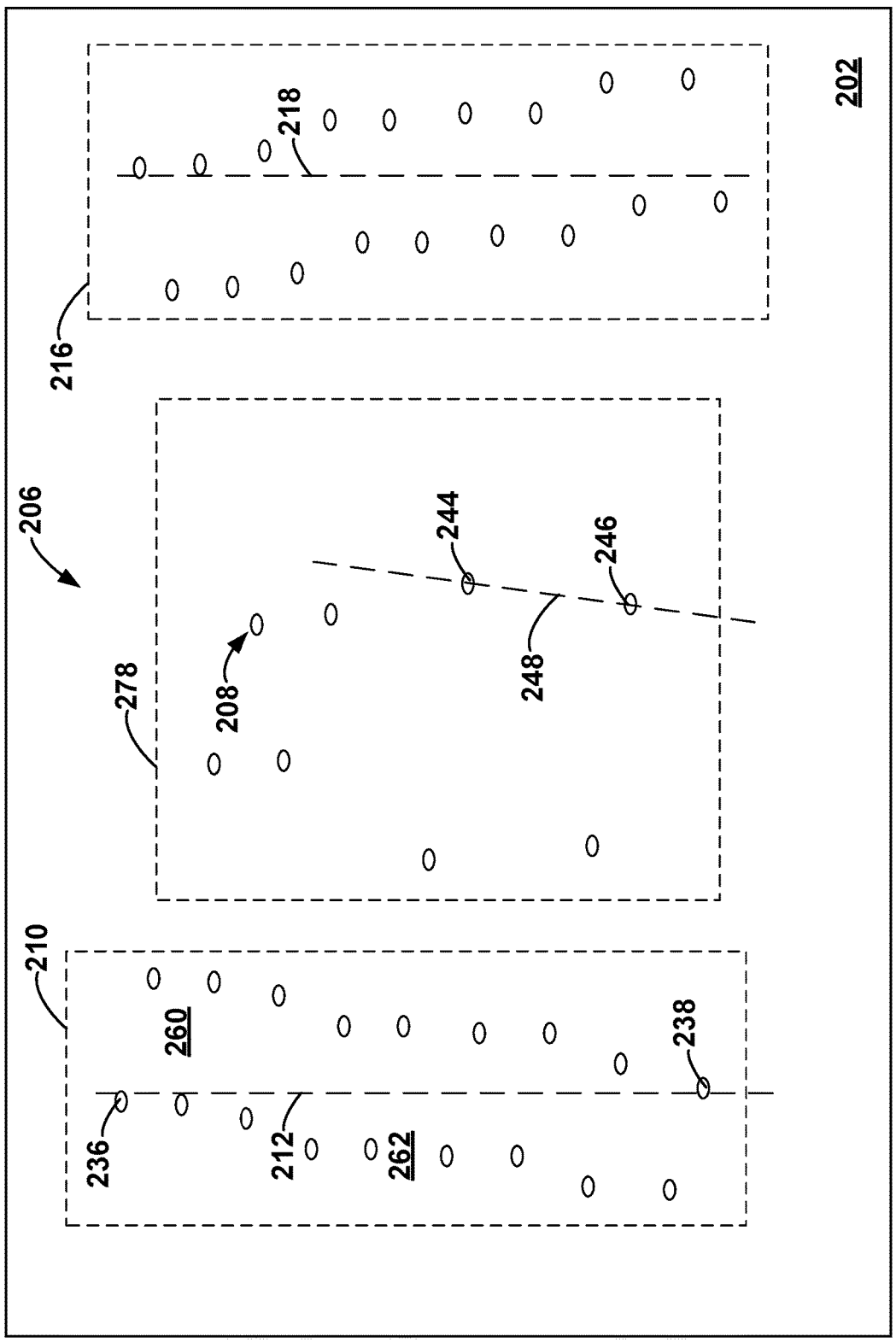
FIG. 5A is a schematic diagram of data corresponding to a surface, according to an example.

FIG. 5A is a schematic diagram of the data 206 corresponding to the surface 202. The navigation system 100 identifies within the data 206 a subset 210 of the data 206 that corresponds to a border 212. The border 212 generally separates a second region 260 of paved surface on a first side of the border 212 from a first region 262 of unpaved surface on a second side of the border 212. In FIG. 5A, the border 212 is a line, but a border can be a curved border that corresponds to an intersection or to a curved section of a runway or a taxiway as well. The border 212 can take on any shape and generally is any boundary that separates a runway or a taxiway from an unpaved surface. The subset 210 of the data 206 can be identified using statistical techniques as described below.

In other examples, a runway surface could be dirt or gravel and the non-runway surface could be grass. In yet other examples, runway surfaces can be distinguished from non-runway surfaces by their differing (e.g., painted) colors and resulting return intensity of the light 204. In yet further examples, the non-runway surface can be paved as well. Generally, a runway surface can be distinguished from a non-runway surface because the light 204 returning from the runway surface will be different in intensity from the light 204 returning from the non-runway surface.

The navigation system 100 (e.g., randomly) selects an arbitrary data point 244 and an arbitrary data point 246 of the data 206 and determines parameters of a curve 248 (e.g., a line) that includes the arbitrary data point 244 and arbitrary data point 246. The parameters could take the form of a, b, and c in the equation $z=ax+by+c$, for example. In other examples, the curve 248 could be an arc of a circle, an arc of an ellipse, a parabola, a hyperbola, etc. Next, the navigation system 100 determines that less than a threshold amount of data points of the data 206 conform to the curve 248 within a margin of error. For example, the navigation system 100 could determine that less than ten data points of the data 206 conform to the curve 248 because less than ten residuals of the data 206 with respect to the curve 248 are less than a threshold amount. This process of searching for a curve fit for much of the data 206 can repeat until the navigation system 100 does find a curve that fits at least the threshold amount of data points of the data 206.

For example, the navigation system 100 (e.g, randomly) selects an arbitrary data point 236 and an arbitrary data point 238 of the data 206 and determines parameters of a curve (e.g., the border 212) that includes the arbitrary data point 236 and the arbitrary data point 238. Next, the navigation system 100 determines that each data point of the subset 210 of the data 206 conforms to the curve (e.g., the border 212) within a margin of error and that the subset 210 of the data 206 includes at least a threshold amount of data points. That is, the navigation system 100 could determine that the subset 210 includes at least ten data points of the data 206, for example.

To additionally confirm a good fit to the curve, the navigation system 100 can determine that the subset 210 of the data 206 includes at least a threshold amount of data points per unit distance along the curve (e.g., the border 212). The threshold amount of data points here could be ten data points per meter along the border 212, for example.

To add additional confidence that the border 212 is, in fact, a border, the navigation system 100 can determine that the subset 210 of the data 206 has an average intensity of the light 204 that is greater than a threshold intensity that typically corresponds to a paved surface.

In some examples, the navigation system 100 determines parameters of a line that corresponds to the border 212 and determines that the region 262 of the surface 202 on one side of the line has an average intensity that is less than a first threshold intensity. Additionally, the navigation system 100 determines that the region 260 of the surface 202 on another side of the line has an average intensity that is greater than a second threshold intensity. In this way, the navigation system 100 can confirm that the border 212 in fact separates a paved region from an unpaved region, or more generally a runway region from a non-runway region.

In some examples, the navigation system 100 also identifies a subset 278 of the data 206 that does not correspond to a border and deletes, filters, or ignores the subset 278 of the data 206 so that it is not further processed.

Additionally, the navigation system 100 causes navigation of the aircraft 10 (e.g., during taxiing) based on a position of the border 212 indicated by the subset 210 of the data 206. For example, the navigation system 100 adjusts the control surfaces 182 and/or the landing gear 184 based on the position of the border 212 indicated by the subset 210 of the data 206. In one example, the aircraft 10 is controlled to maintain a minimum distance from the border 212. Navigation can also be aided by the data 192 collected by the inertial navigation system 190 of the aircraft 10.

The navigation system 100 can also identify a subset 216 of the data 206 that corresponds to a border 218. In such examples, the navigation system 100 can cause navigation of the aircraft 10 additionally based on a position of the border 218 indicated by the subset 216 of the data 206. For example, the aircraft 10 could be controlled to stay substantially centered between the border 212 and the border 218. As shown in FIG. 5A, the border 218 is substantially parallel to the border 212. Additionally, the border 212 could be on a first side of the aircraft 10 and the border 218 could be on a second side of the aircraft 10 that is opposite the first side.

Figure 5B:
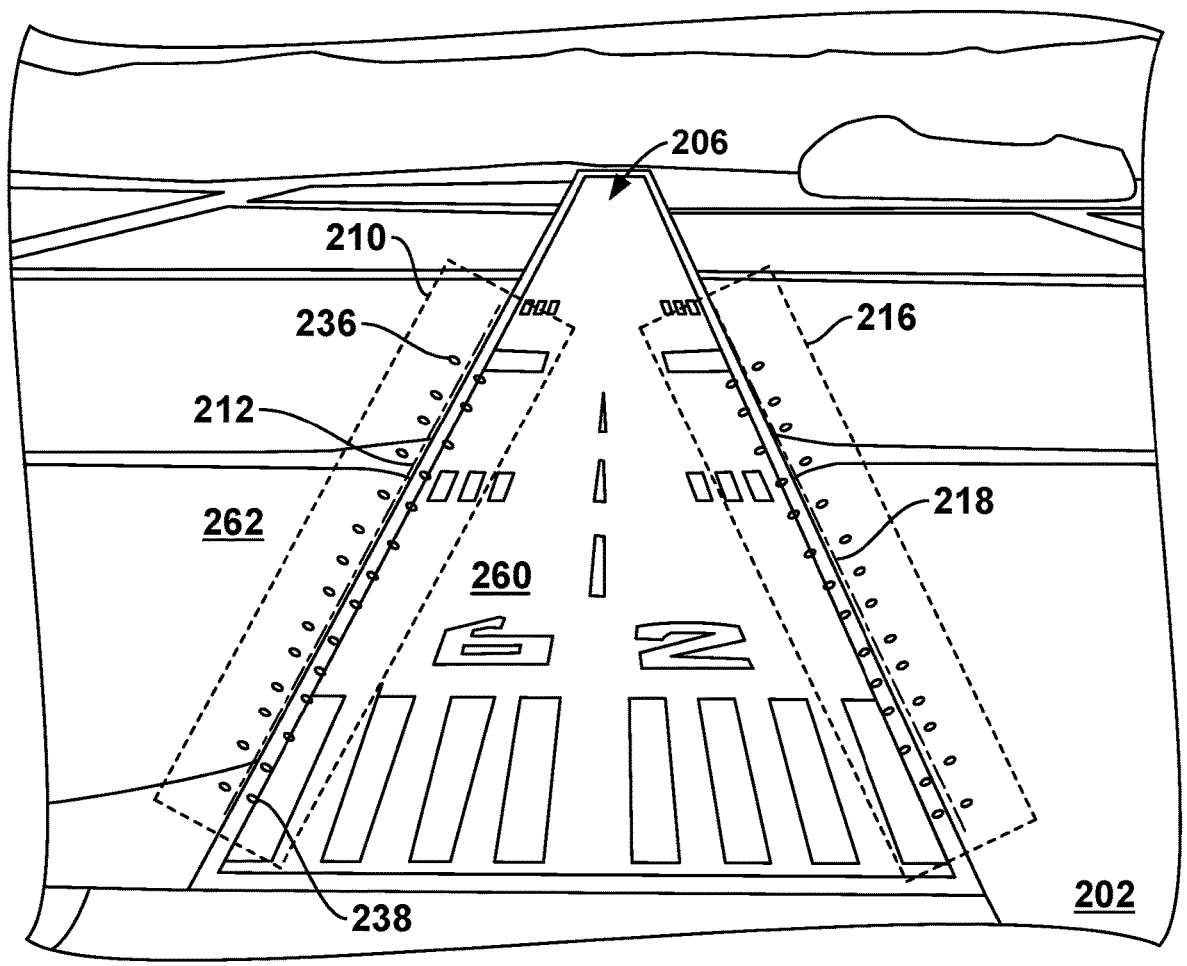
FIG. 5B is a schematic diagram of data corresponding to a surface, according to an example.

FIG. 5B is a schematic diagram of a portion of the data 206 corresponding to the surface 202, with a more forward-looking perspective than FIG. 5A. FIG. 5B also includes a pictorial representation of an example runway, for the purpose of clarity.

Figure 6:
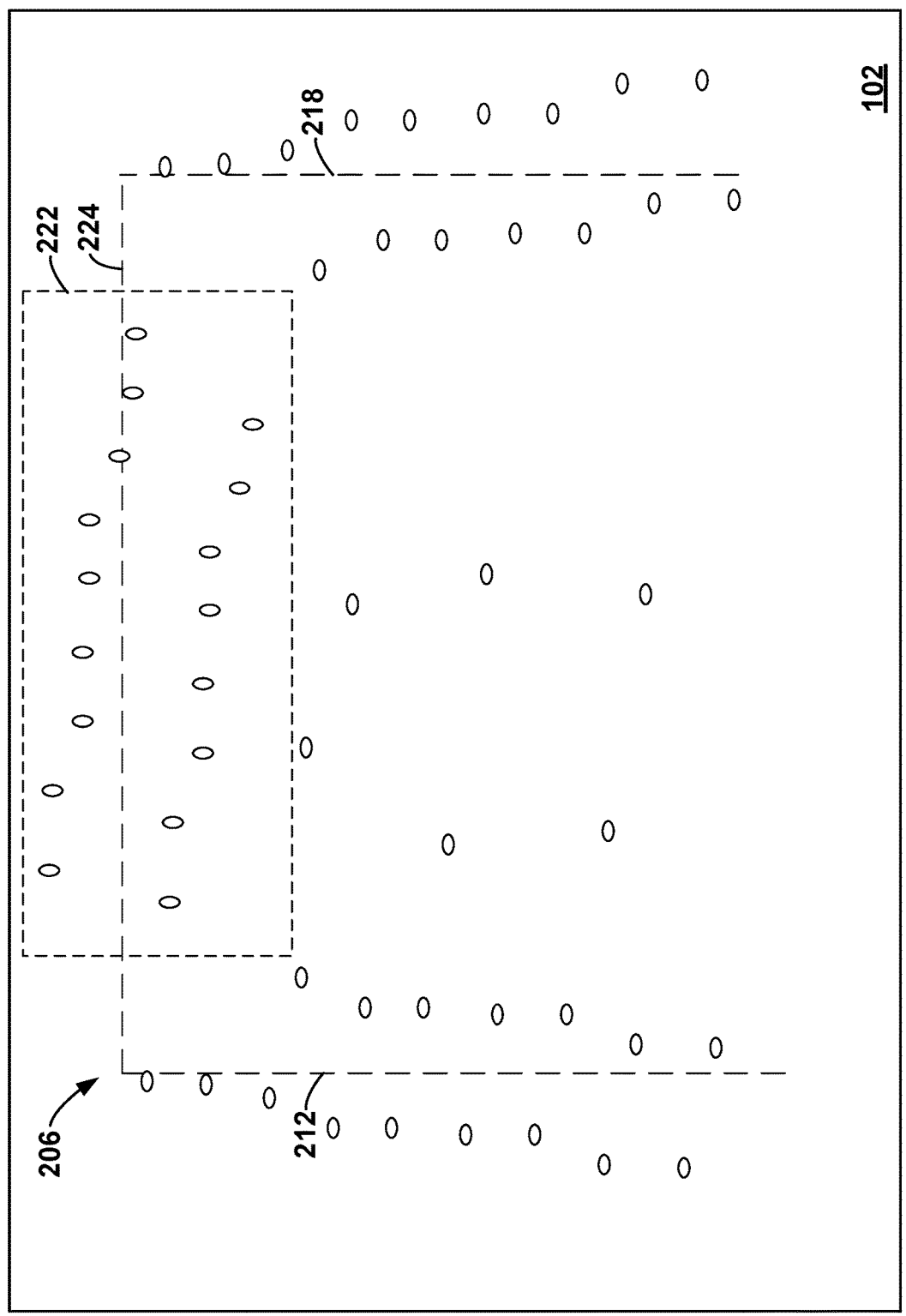
FIG. 6 is a schematic diagram of data corresponding to a surface, according to an example.

FIG. 6 is a schematic diagram of the data 206 shown corresponding to the surface 202. In this example, a border 224 intersects both the border 212 and the border 218 to form a dead end. As such, the navigation system 100 identifies a subset 222 of the data 206 that corresponds to the border 224 that intersects the border 212 and the border 218. In this context, the navigation system 100 causes navigation of the aircraft 10 additionally based on a position of the border 224 indicated by the subset 222 of the data 206. For example, upon encountering the dead end, the aircraft 10 is controlled to turn around or stop.

Figure 7A:
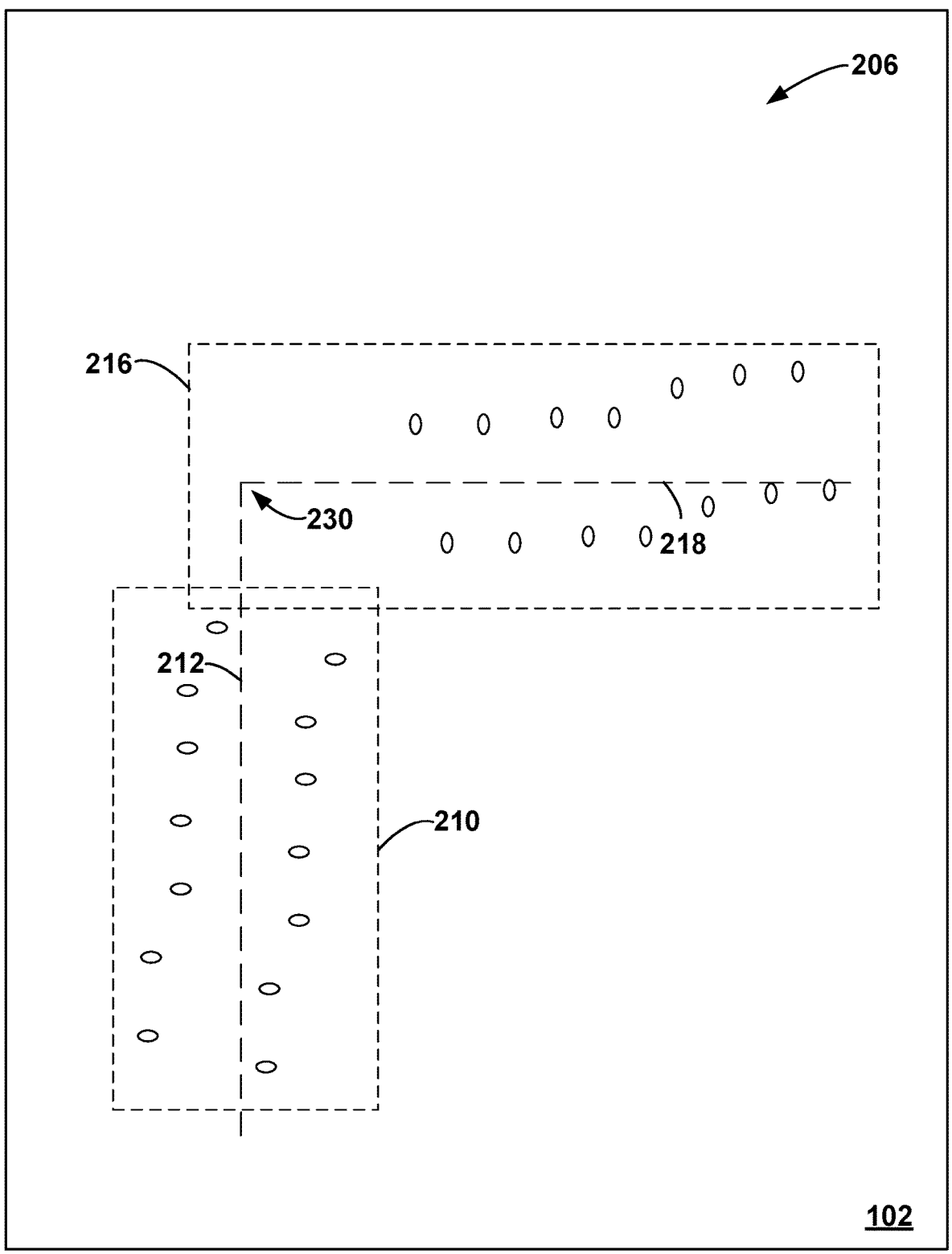
FIG. 7A is a schematic diagram of data corresponding to a surface, according to an example.

FIG. 7A is a schematic diagram of the data 206 shown mapped onto the surface 202. In this example, the border 212 intersects the border 218 to form a 90 degree corner at an intersection. Other examples include the border 212 forming a rounded corner with the border 218.

As such, the navigation system 100 determines an angle 230 at which the border 212 intersects the border 218 and a position of the angle 230. In this context, the navigation system 100 can cause navigation of the aircraft 10 additionally based on the angle (e.g., the value of the angle) and the position of the angle. That is, the aircraft 10 could make a 90 degree right turn after passing the border 218. In another example, the angle 230 could be 45 degrees and the aircraft 10 could make a 45 degree right turn at the angle 230.

Figure 7B:
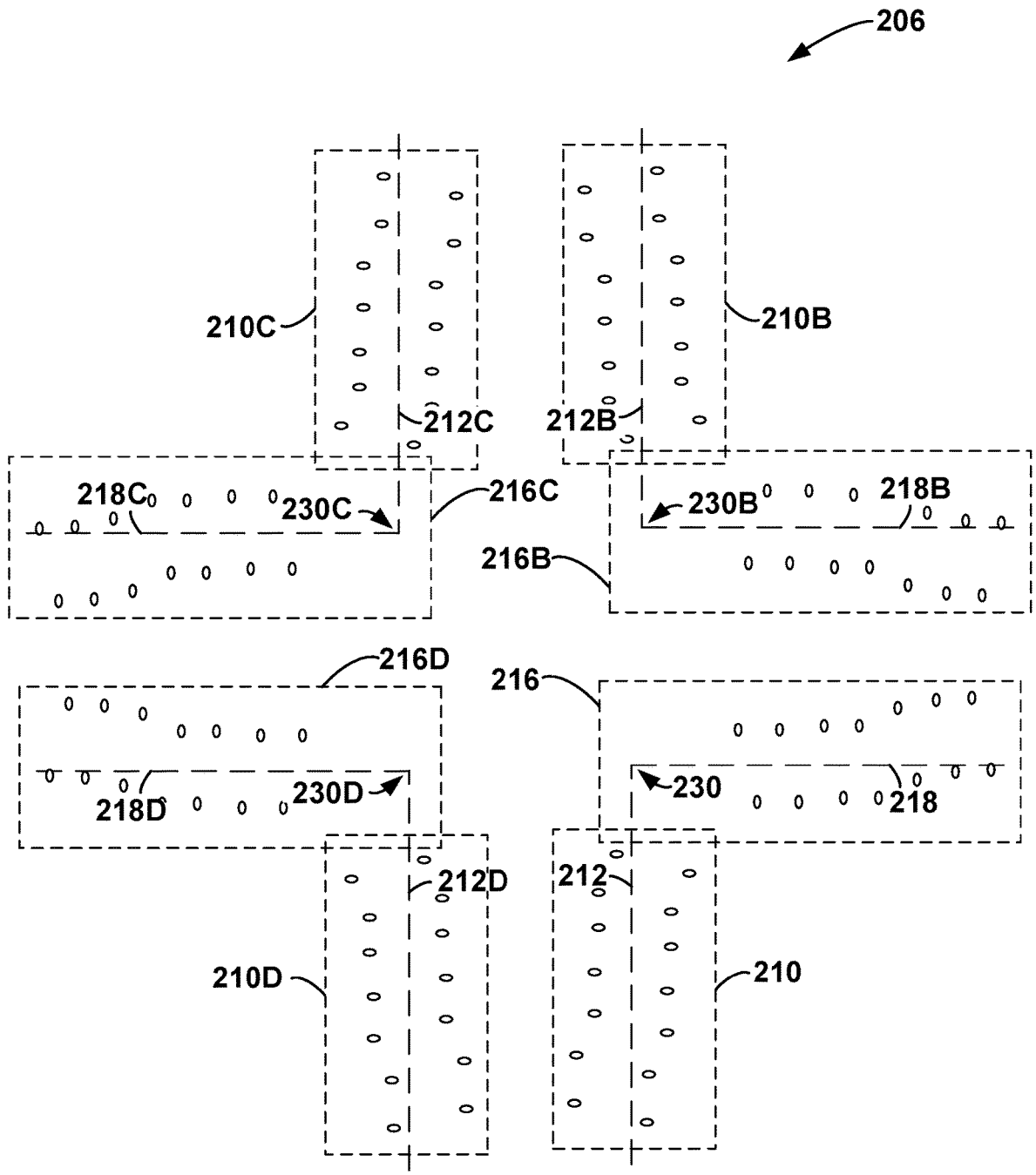
FIG. 7B is a schematic diagram of data corresponding to a surface, according to an example.

FIG. 7B is a schematic diagram of the data 206 in an example in which runway surfaces form a four-way intersection. The navigation system 100 additionally determines that a subset 210B of the data 206 represents a border 212B, determines that a subset 216B of the data 206 represents a border 218B, and determines an angle 230B at which the border 212B intersects the border 218B and a position of the angle 230B. The navigation system 100 additionally determines that a subset 210C of the data 206 represents a border 212C, determines that a subset 216C of the data 206 represents a border 218C, and determines an angle 230C at which the border 212C intersects the border 218C and a position of the angle 230C. The navigation system 100 additionally determines that a subset 210D of the data 206 represents a border 212D, determines that a subset 216D of the data 206 represents a border 218D, and determines an angle 230D at which the border 212D intersects the border 218D and a position of the angle 230D.

In this context, the navigation system 100 can cause navigation of the aircraft 10 additionally based on the angles 230, 230B, 230C, and/or 230D (e.g., the value of the angles) and the position of the angles 230, 230B, 230C, and/or 230D. That is, the aircraft 10 could make a 90 degree right turn after passing the border 218, upon recognizing the four-way intersection.

In some embodiments, the navigation system 100 could look for a particular shape of intersection before executing a turn. For example, the aircraft 10 could be instructed to ignore a 45 degree turn that is encountered first and make a 90 degree right turn at the angle 230 thereafter in response to recognizing the 90 degree intersection of the border 212 and the border 218.

FIGS. 8-13 are block diagrams of methods 300, 310, 314, 318, 322, and 326 for operating a navigation system of an aircraft. The methods 300, 310, 314, 318, 322, and 326 present examples of methods that could be used with the navigation system 100 as shown in FIGS. 1-7. As shown in FIGS. 8-13, the methods 300, 310, 314, 318, 322, and 326 include one or more operations, functions, or actions as illustrated by blocks 302, 304, 306, 308, 312, 316, 320, 324, 328, and 330. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Figure 8:
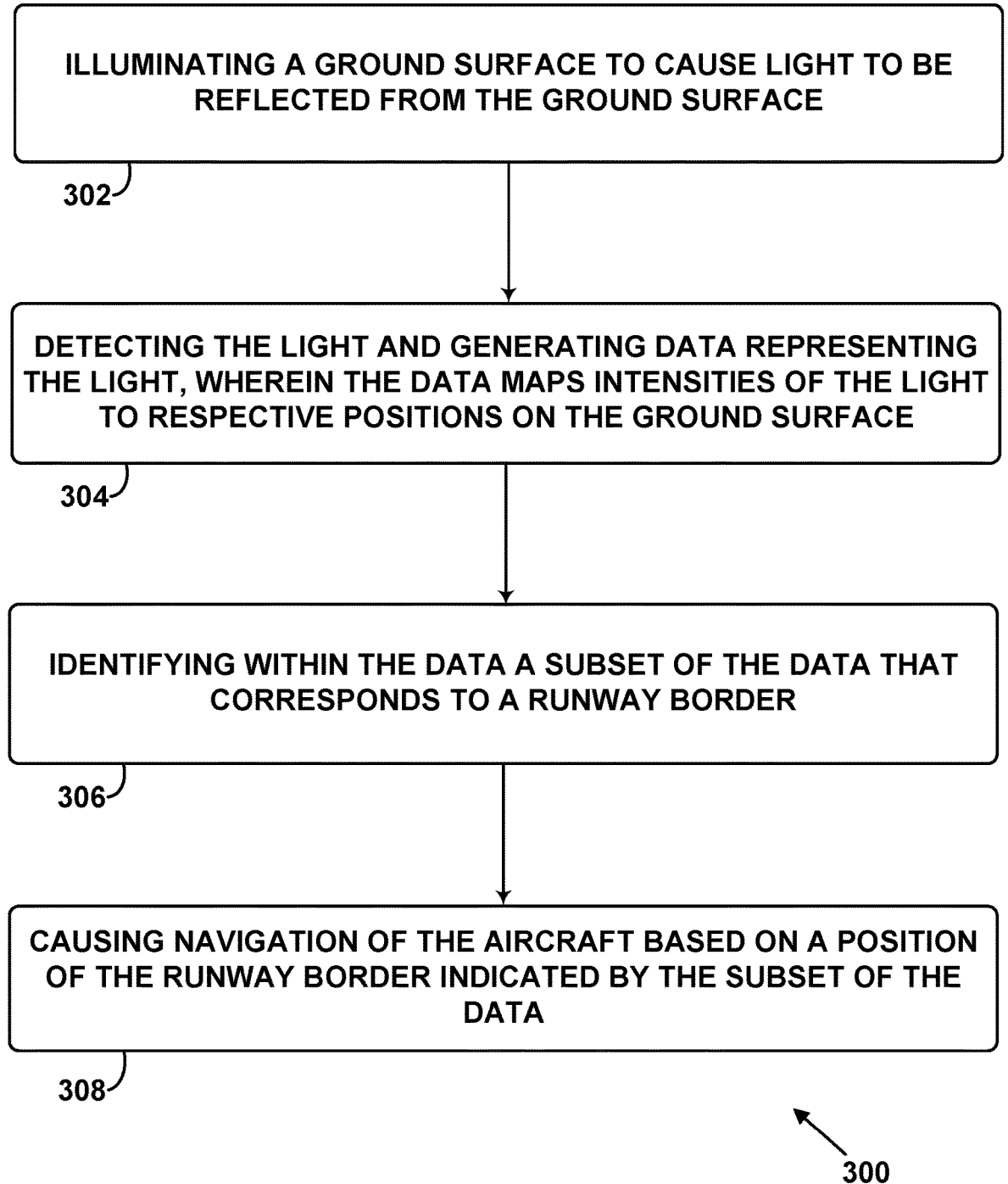
FIG. 8 is a block diagram of a method, according to an example.

FIG. 8 is a block diagram of the method 300.

At block 302, the method 300 includes illuminating the surface 202 to cause the light 204 to be reflected from the surface 202. For example, the light source 102 is used to illuminate the surface 202 with a light 203 (e.g., a laser light) to cause the light 204 to be reflected from the surface 202. This functionality is described in more detail with reference to FIG. 4 above.

At block 304, the method 300 includes detecting the light 204 and generating the data 206 representing the light 204. The data 206 maps intensities of the light 204 to respective positions 208 on the surface 202. For example, the light sensor 104 detects the light 204 that reflects from the surface 202 and generates the data 206 representing the light 204. The data 206 maps intensities of the light 204 to respective positions on the surface 202. For example, the data 206 includes a table that maps intensity values of the light 204 to respective sets of three-dimensional Cartesian or spherical coordinates. This functionality is described in more detail with reference to FIG. 4, FIG. 5A, and FIG. 5B above.

At block 306, the method 300 includes identifying within the data 206 the subset 210 of the data 206 that corresponds to the border 212. For example, the navigation system 100 identifies within the data 206 the subset 210 of the data 206. This functionality is described in more detail with reference to FIG. 5A and FIG. 5B above.

At block 308, the method 300 includes causing navigation of the aircraft 10 based on a position of the border 212 indicated by the subset 210 of the data 206. For example, the navigation system 100 causes navigation of the aircraft 10 based on the position of the border 212. This functionality is described in more detail with reference to FIGS. 5-7 above.

FIG. 9 is a block diagram of the method 310.

At block 312, the method 310 includes identifying the second subset 216 of the data 206 that corresponds to the second border 218. For example, the navigation system 100 identifies the second subset 216. This functionality is described in more detail with reference to FIG. 5A and FIG. 5B above.

FIG. 10 is a block diagram of the method 314.

At block 316, the method 314 includes identifying the third subset 222 of the data 206 that corresponds to the third border 224 that intersects the first border 212 and the second border 218. For example, the navigation system 100 identifies the third subset 222. This functionality is described in more detail with reference to FIG. 6 above.

FIG. 11 is a block diagram of the method 318.

At block 320, the method 318 includes determining the angle 230 at which the first border 212 intersects the second border 218 and a position of the angle 230. For example, the navigation system 100 determines the angle 230 and the position of the angle 230. This functionality is described in more detail with reference to FIG. 7A and FIG. 7B above.

FIG. 12 is a block diagram of the method 322.

At block 324, the method 322 includes determining that the first border 212 forms a particular shape with the second border 218. For example, the navigation system 100 determines that the border 212 forms the particular shape with the second runway border 218. This functionality is described in more detail with reference to FIG. 7A and FIG. 7B above.

FIG. 13 is a block diagram of the method 326.

At block 328, the method 326 includes identifying the subset 278 of the data 206 that does not correspond to a border. For example, the navigation system 100 identifies the subset 278. This functionality is described in more detail with reference to FIG. 5A and FIG. 5B above.

At block 330, the method 326 includes deleting the subset 278 of the data 206. For example, the navigation system 100 deletes the subset 278. This functionality is described in more detail with reference to FIG. 5A and FIG. 5B above.

Examples of the present disclosure can thus relate to one of the enumerated clauses (ECs) listed below.

EC 1 is a navigation system for an aircraft comprising: a light source; a light sensor; one or more processors; and a computer readable medium storing instructions that, when executed by the one or more processors, cause the navigation system to perform functions comprising: illuminating a surface using the light source to cause light to be reflected from the surface; detecting the light and generating data representing the light using the light sensor, wherein the data maps intensities of the light to respective positions on the surface; identifying within the data a subset of the data that corresponds to a border; and causing navigation of the aircraft based on a position of the border indicated by the subset of the data.

EC 2 is the navigation system of EC 1, wherein the border is a first border, the functions further comprising: identifying a second subset of the data that corresponds to a second border, wherein causing navigation of the aircraft comprises causing navigation of the aircraft additionally based on a second position of the second border indicated by the second subset of the data.

EC 3 is the navigation system of EC 2, wherein the second border is substantially parallel to the first border.

EC 4 is the navigation system of EC 3, the functions further comprising: identifying a third subset of the data that corresponds to a third border that intersects the first border and the second border, wherein causing navigation of the aircraft comprises causing navigation of the aircraft additionally based on a third position of the third border indicated by the third subset of the data.

EC 5 is the navigation system of any of ECs 2-4, wherein the first border is on a first side of the aircraft and the second border is on a second side of the aircraft that is opposite the first side.

EC 6 is the navigation system of any of ECs 2-5, wherein the first border intersects the second border.

EC 7 is the navigation system of EC 6, the functions further comprising: determining an angle at which the first border intersects the second border and a position of the angle, wherein causing navigation of the aircraft comprises causing navigation of the aircraft additionally based on the position and the angle.

EC 8 is the navigation system of any of ECs 2-7, the functions further comprising: determining that the first border forms a particular shape with the second border, wherein causing navigation of the aircraft comprises causing navigation of the aircraft additionally based on determining that the first border forms the particular shape with the second border.

EC 9 is the navigation system of any of ECs 1-8, wherein causing navigation of the aircraft comprises causing navigation of the aircraft on the surface.

EC 10 is the navigation system of any of ECs 1-9, wherein identifying the subset of the data comprises: selecting two arbitrary data points of the data; determining parameters of a shape that includes the two arbitrary data points; and determining that each data point of the subset of the data conforms to the shape within a margin of error and that the subset of the data includes at least a threshold amount of data points.

EC 11 is the navigation system of EC 10, wherein identifying the subset of the data further comprises: selecting a second two arbitrary data points of the data; determining parameters of a second curve that includes the second two arbitrary data points; and determining that less than the threshold amount of data points of the data conform to the second curve within the margin of error.

EC 12 is the navigation system of any of ECs 10-11, wherein identifying the subset of the data further comprises determining that the subset of the data includes at least a second threshold amount of data points per unit distance.

EC 13 is the navigation system of any of ECs 10-12, wherein identifying the subset of the data further comprises determining that the subset of the data has an average intensity that is greater than a threshold intensity.

EC 14 is the navigation system of any of ECs 1-13, wherein causing navigation of the aircraft comprises causing navigation of the aircraft additionally based on data collected by an inertial navigation system of the aircraft.

EC 15 is the navigation system of any of ECs 1-14, wherein identifying the subset of the data comprises: determining parameters of a line that corresponds to the border; determining that a first region of the surface on a first side of the line has a first average intensity that is less than a first threshold intensity; and determining that a second region of the surface on a second side of the line has a second average intensity that is greater than a second threshold intensity.

EC 16 is the navigation system of any of ECs 1-15, wherein causing navigation of the aircraft comprises adjusting a control surface or landing gear of the aircraft based on the position of the border indicated by the subset of the data.

EC 17 is the navigation system of any of ECs 1-16, wherein the subset is a first subset, the functions further comprising: identifying a second subset of the data that does not correspond to a border; and deleting the second subset of the data.

EC 18 is a non-transitory computer readable medium storing instructions that, when executed by a navigation system of an aircraft, cause the navigation system to perform functions comprising: illuminating a surface to cause light to be reflected from the surface; detecting the light and generating data representing the light, wherein the data maps intensities of the light to respective positions on the surface; identifying within the data a subset of the data that corresponds to a border; and causing navigation of the aircraft based on a position of the border indicated by the subset of the data.

EC 19 is a method of operating a navigation system of an aircraft, the method comprising: illuminating a surface to cause light to be reflected from the surface; detecting the light and generating data representing the light, wherein the data maps intensities of the light to respective positions on the surface; identifying within the data a subset of the data that corresponds to a border; and causing navigation of the aircraft based on a position of the border indicated by the subset of the data.

EC 20 is the method of EC 19, wherein identifying the subset of the data comprises: selecting two arbitrary data points of the data; determining parameters of a curve that includes the two arbitrary data points; and determining that each data point of the subset of the data conforms to the curve within a margin of error and that the subset of the data includes at least a threshold amount of data points. The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A navigation system for an aircraft comprising:
a light source;
a light sensor;

one or more processors; and
a computer readable medium storing instructions that, when executed by the one or more processors, cause the navigation system to perform functions comprising:
  illuminating a surface using the light source to cause light to be reflected from the surface;
  detecting the light and generating data representing the light using the light sensor, wherein the data maps intensities of the light to respective positions on the surface;
  identifying within the data a subset of the data that corresponds to a border by:
    selecting two arbitrary data points of the data;
    determining parameters of a curve that includes the two arbitrary data points;
    determining, with respect to the curve, residuals of data points of the subset of the data that are not the two arbitrary data points;
    determining that the residuals are each less than a margin of error and that the subset of the data includes at least a threshold amount of data points; and
    determining that the subset of the data includes at least a second threshold amount of data points per unit distance; and
  causing navigation of the aircraft on the surface based on a position of the border indicated by the subset of the data.

2. The navigation system of claim 1, wherein the border is a first border, the functions further comprising:
  identifying a second subset of the data that corresponds to a second border,
  wherein causing navigation of the aircraft comprises causing navigation of the aircraft additionally based on a second position of the second border indicated by the second subset of the data.

3. The navigation system of claim 2, wherein the second border is substantially parallel to the first border.

4. The navigation system of claim 3, the functions further comprising:
  identifying a third subset of the data that corresponds to a third border that intersects the first border and the second border,
  wherein causing navigation of the aircraft comprises causing navigation of the aircraft additionally based on a third position of the third border indicated by the third subset of the data.

5. The navigation system of claim 2, wherein the first border is on a first side of the aircraft and the second border is on a second side of the aircraft that is opposite the first side.

6. The navigation system of claim 2, wherein the first border intersects the second border.

7. The navigation system of claim 6, the functions further comprising:
  determining an angle at which the first border intersects the second border and a position of the angle,
  wherein causing navigation of the aircraft comprises causing navigation of the aircraft additionally based on the position and the angle.

8. The navigation system of claim 2, the functions further comprising:
  determining that the first border forms a particular shape with the second border,
  wherein causing navigation of the aircraft comprises causing navigation of the aircraft additionally based on determining that the first border forms the particular shape with the second border.

9. The navigation system of claim 1, wherein identifying the subset of the data further comprises:
  selecting a second two arbitrary data points of the data;
  determining parameters of a second curve that includes the second two arbitrary data points; and
  determining that less than the threshold amount of data points of the data conform to the second curve within the margin of error.

10. The navigation system of claim 1, wherein identifying the subset of the data further comprises determining that the subset of the data has an average intensity that is greater than a threshold intensity.

11. The navigation system of claim 1, wherein causing navigation of the aircraft comprises causing navigation of the aircraft additionally based on data collected by an inertial navigation system of the aircraft.

12. The navigation system of claim 1, wherein identifying the subset of the data further comprises:
  determining parameters of a line that corresponds to the border;
  determining that a first region of the surface on a first side of the line has a first average intensity that is less than a first threshold intensity; and
  determining that a second region of the surface on a second side of the line has a second average intensity that is greater than a second threshold intensity.

13. The navigation system of claim 1, wherein causing navigation of the aircraft comprises adjusting a control surface or propelling the aircraft via motorized landing gear of the aircraft based on the position of the border indicated by the subset of the data.

14. The navigation system of claim 1, wherein the subset is a first subset, the functions further comprising:
  identifying a second subset of the data that does not correspond to a border; and
  deleting the second subset of the data.

15. A non-transitory computer readable medium storing instructions that, when executed by a navigation system of an aircraft, cause the navigation system to perform functions comprising:
  illuminating a surface to cause light to be reflected from the surface;
  detecting the light and generating data representing the light, wherein the data maps intensities of the light to respective positions on the surface;
  identifying within the data a subset of the data that corresponds to a border by:
    selecting two arbitrary data points of the data;
    determining parameters of a curve that includes the two arbitrary data points;
    determining, with respect to the curve, residuals of data points of the subset of the data that are not the two arbitrary data points;
    determining that the residuals are each less than a margin of error and that the subset of the data includes at least a threshold amount of data points; and
    determining that the subset of the data includes at least a second threshold amount of data points per unit distance; and
  causing navigation of the aircraft on the surface based on a position of the border indicated by the subset of the data.

16. A method of operating a navigation system of an aircraft, the method comprising:

illuminating a surface to cause light to be reflected from the surface;

detecting the light and generating data representing the light, wherein the data maps intensities of the light to respective positions on the surface;

identifying within the data a subset of the data that corresponds to a border by:

selecting two arbitrary data points of the data;

determining parameters of a curve that includes the two arbitrary data points;

determining, with respect to the curve, residuals of data points of the subset of the data that are not the two arbitrary data points;

determining that the residuals are each less than a margin of error and that the subset of the data includes at least a threshold amount of data points; and determining that the subset of the data includes at least a second threshold amount of data points per unit distance; and causing navigation of the aircraft on the surface based on a position of the border indicated by the subset of the data.

17. The navigation system of claim 1, wherein causing the navigation of the aircraft comprises causing the navigation of the aircraft such that the aircraft maintains a minimum distance from the border.

18. The method of claim 16, wherein the border is a first border, the method further comprising:

identifying a second subset of the data that corresponds to a second border, wherein causing navigation of the aircraft comprises causing navigation of the aircraft additionally based on a second position of the second border indicated by the second subset of the data.

19. The navigation system of claim 1, wherein selecting the two arbitrary data points comprises randomly selecting the two arbitrary data points.

20. The method of claim 16, wherein selecting the two arbitrary data points comprises randomly selecting the two arbitrary data points.

* * * * *